United States Patent
Péglion

(10) Patent No.: US 7,409,210 B2
(45) Date of Patent: Aug. 5, 2008

(54) CONTROLLING ROAMING IN A MOBILE SYSTEM

(75) Inventor: Marc Péglion, Espoo (FI)

(73) Assignee: Nokia Corporation, Espoo (FI)

( * ) Notice: Subject to any disclaimer, the term of this patent is extended or adjusted under 35 U.S.C. 154(b) by 771 days.

(21) Appl. No.: 10/327,962

(22) Filed: Dec. 26, 2002

(65) Prior Publication Data

US 2003/0143996 A1 Jul. 31, 2003

Related U.S. Application Data

(63) Continuation of application No. PCT/FI01/00612, filed on Jun. 27, 2001.

(30) Foreign Application Priority Data

Jun. 28, 2000 (FI) .................................. 20001531

(51) Int. Cl.
 *H04Q 7/20* (2006.01)
(52) U.S. Cl. .................................... 455/432.1
(58) Field of Classification Search .............. 455/432.1, 455/552.1, 406, 435.1, 428, 408, 433, 413, 455/456.1, 411, 510, 453, 432.2, 456; 370/337, 370/352, 462; 380/248, 44

See application file for complete search history.

(56) References Cited

U.S. PATENT DOCUMENTS

| | | | | |
|---|---|---|---|---|
| 5,153,919 A * | 10/1992 | Reeds et al. | .................... | 380/44 |
| 5,377,267 A * | 12/1994 | Suzuki et al. | ................ | 380/248 |
| 5,537,474 A * | 7/1996 | Brown et al. | ................. | 380/248 |
| 5,561,836 A * | 10/1996 | Sowles et al. | ................ | 455/428 |
| 5,574,728 A * | 11/1996 | Mamaghani et al. | ......... | 370/462 |
| 5,581,802 A * | 12/1996 | Erickson et al. | .............. | 455/510 |
| 5,610,973 A * | 3/1997 | Comer | ........................ | 455/413 |
| 5,862,480 A | 1/1999 | Wild et al. | | |
| 5,862,481 A * | 1/1999 | Kulkarni et al. | ........... | 455/432.2 |
| 5,940,512 A * | 8/1999 | Tomoike | ....................... | 380/248 |
| 6,032,044 A * | 2/2000 | Shannon et al. | .............. | 455/433 |
| 6,081,705 A * | 6/2000 | Houde et al. | ................. | 455/411 |
| 6,104,929 A * | 8/2000 | Josse et al. | ................... | 455/445 |
| 6,122,510 A | 9/2000 | Granberg | | |
| 6,137,791 A * | 10/2000 | Frid et al. | .................... | 370/352 |
| 6,463,286 B1 * | 10/2002 | Salminen | ..................... | 455/453 |

(Continued)

FOREIGN PATENT DOCUMENTS

WO WO 99/23836 5/1999

(Continued)

*Primary Examiner*—Charles N Appiah
*Assistant Examiner*—Kiet Doan
(74) *Attorney, Agent, or Firm*—Squire, Sanders & Dempsey, L.L.P.

(57) ABSTRACT

A method of controlling roaming in a mobile system (3) comprising at least two networks (5 and 6), which can offer a subscriber (1) attached to the system a circuit-switched and a packet-switched connection, comprising the steps of checking, when a subscriber attempts to attach to the mobile system, separately for each network (5 and 6) comprised by the mobile system (3), from a first network element (HLR) comprising the subscriber's roaming right data if the subscriber (1) is entitled to roam that particular type of network of that particular mobile system, and allowing or denying the subscriber's roaming in each network (5 and 6) of the mobile system (3) separately on the basis of said check.

14 Claims, 1 Drawing Sheet

U.S. PATENT DOCUMENTS

| | | | |
|---|---|---|---|
| 6,480,476 B1 * | 11/2002 | Willars | 370/311 |
| 6,496,690 B1 * | 12/2002 | Cobo et al. | 455/408 |
| 6,584,310 B1 * | 6/2003 | Berenzweig | 455/432.1 |
| 6,643,511 B1 * | 11/2003 | Rune et al. | 455/433 |
| 6,654,589 B1 * | 11/2003 | Haumont | 455/67.11 |
| 6,731,617 B1 * | 5/2004 | Mizell et al. | 370/328 |
| 6,744,750 B1 * | 6/2004 | Berger | 370/337 |
| 2002/0132623 A1 * | 9/2002 | Kingdon | 455/456 |

FOREIGN PATENT DOCUMENTS

WO     WO 99/39534     8/1999

* cited by examiner

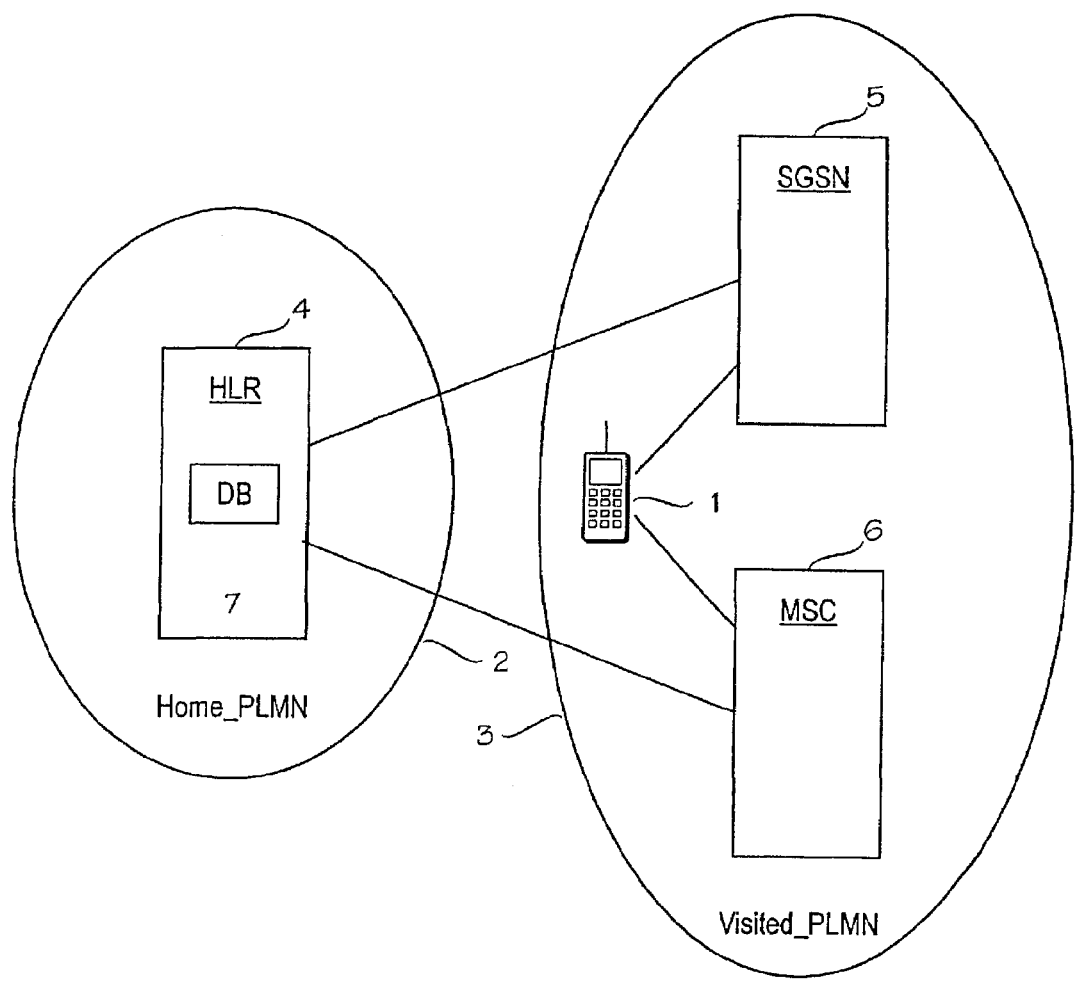
Figure

CONTROLLING ROAMING IN A MOBILE SYSTEM

This is a Continuation of International Application No. PCT/FI01/00612 filed Jun. 27, 2001, which designated the U.S. and was published under PCT Article 21(2) in English.

BACKGROUND OF THE INVENTION

The invention relates to controlling roaming in a mobile system.

A general packet radio service GPRS is a new service in the GSM (Global System for Mobile Communication) and it is one of the items being standardized at the ETSI (European Telecommunication Standard Institute). The GPRS operational environment consists of one or more sub-network service areas that are interconnected by a GPRS backbone network. A sub-network comprises a number of packet data service nodes, which are herein called GPRS support nodes and each one of which is connected to the GSM mobile network, for example to a mobile switching centre MSC, allowing them to provide mobile data terminals with packet data service via several base stations, i.e. cells. An intermediate mobile network provides circuit-switched or packet-switched data transmission between a support node and mobile stations. Different sub-networks, in turn, are connected to an external data network, for example to a packet switched public data network PSPDN. The GPRS service can thus be used for achieving packet data transmission between mobile stations and external data networks, with the GSM network acting as an access network. One of the features of the GPRS service network is that it operates almost independently of the GSM network.

The GSM/GPRS mobile system usually comprises two databases including data on mobile subscribers: a home location register HLR, which comprises data on all subscribers of the mobile system and the services subscribed by them, and a visitor location register VLR, which comprises data on mobile stations roaming the area of a given mobile switching centre MSC. Within this application, the concept "roaming" should be understood to mean the attachment of a mobile subscriber to an alien mobile system (or a network of an alien mobile system), i.e. other than the subscriber's home mobile system, thus allowing the subscriber to use at least some of the services provided by said alien mobile system. When a mobile subscriber moves to the area of an alien mobile system and tries to attach thereto, the alien mobile system checks from the home location register of the subscriber's home system if the subscriber is entitled to roam said system. If the mobile station supports both circuit-switched (e.g. GSM) and packet-switched GPRS functions, it will try to attach to both the GSM network and the GPRS network. As regards the GSM network, the access request is relayed to the mobile switching centre MSC, which checks from the home location register of the subscriber's home system if the subscriber's roaming is allowed. Similarly, as regards the GPRS network, the access request is relayed to the serving GPRS support node SGSN, which also checks from the home location register of the subscriber's home system if the subscriber's roaming is allowed. In accordance with prior art, the home location register gives the same reply to the inquiries made by both network elements (MSC and SGSN).

The problem in the above arrangement is that there may be for instance an agreement between the operator maintaining the subscriber's home system and the operator maintaining the alien system that entitles the subscriber to the use of only one network (or some networks), e.g. a GSM network or a GPRS network, of the alien system, but not all networks. In this case it should be possible to allow the subscriber to attach to the network(s) of the alien system allowed to the subscriber, and, on the other hand, to prevent the subscriber from attaching to the network(s) of the alien system not allowed to the subscriber. However, this is impossible in the prior art arrangement, which does not distinguish between the different networks comprised by a mobile system.

BRIEF DESCRIPTION OF THE INVENTION

It is an object of the invention to provide a method and equipment for implementing the method so as to solve the above problems. The object of the invention is achieved with a method and an arrangement, which are characterized by what is disclosed in the independent claims 1 and 10. The preferred embodiments of the invention are disclosed in the dependent claims.

The invention is based on allowing or denying network-specifically the subscriber's roaming in a network of an alien mobile system, when a subscriber attempts to attach to a network of the alien mobile system, on the basis of the subscriber's roaming right data, which data indicates whether the subscriber is entitled to roam a particular type of network in the particular alien mobile system.

The advantage of the system and arrangement of the invention is that a subscriber of a mobile system can be allowed or denied roaming a given type of network, for example a packet-switched GPRS network, of an alien mobile system, without this affecting the subscriber's roaming one or more other types of networks, for example a circuit-switched GSM network, of the alien mobile system.

In accordance with a preferred embodiment of the invention, when at least two subscription types are definable for a subscriber, and when the subscriber attempts to attach to a network in an alien mobile system, an additional check is made in the home location register in the roaming subscriber's home system or in a similar network element, which comprises data on said subscription types defined for the subscriber and on subscription types for which roaming is allowed in said alien mobile system, regarding these subscription types to find out if roaming in a network of said alien mobile system is allowed for said subscription type, and, on the basis of said check, the subscriber's roaming the network of the alien mobile system is allowed or denied. The advantage of this preferred embodiment is that it also allows the subscription types, relating for example to charging, that are allowed in each mobile system at each particular time to be taken into account.

BRIEF DESCRIPTION OF THE FIGURES

The invention will be described in the following in conjunction with preferred embodiments with reference to the attached FIGURE, which shows an embodiment of an arrangement of the invention.

DETAILED DESCRIPTION OF THE INVENTION

The FIGURE shows an embodiment of an arrangement of the invention. Even though the invention will be discussed below mainly in connection with the GPRS network and the GSM or a corresponding circuit-switched network, this does in no way restrict the application of the invention in other types of mobile systems, such as the GSM-based third generation mobile system UMTS (Universal Mobile Telecommunications System), which is being standardized by the 3GPP (3$^{rd}$ Generation Partnership Project) and comprises, for example, a new radio interface. It is to be noted that, for the sake of clarity, the FIGURE only shows components relevant to the invention. The arrangement in the FIGURE comprises two mobile systems 2 and 3. The FIGURE also shows a mobile subscriber 1, whose home mobile system (Home_PLMN) is assumed to be mobile system 2, and which roams mobile system 3 (Visited_PLMN). The mobile subscriber 1 communicates with mobile systems 2 and 3 by using a mobile subscriber station which is not shown as a separate element in the FIGURE. In this context, a mobile system refers for example to the public land mobile network (PLMN), which may comprise several types of networks: for example a circuit-switched network, such as the GSM, and a packet-switched network, such as the GPRS. The subscriber's 1 home mobile system 2 comprises the subscriber's 1 home location register (HLR) 4. The mobile system 3, which the subscriber 1 roams, comprises a circuit-switched network 6 and a packet-switched network 5. As regards the circuit-switched network, the FIGURE only shows a mobile switching centre MSC and, as regards the packet-switched network, the support node SGSN. For the sake of clarity, the FIGURE does not show any other network elements.

Accordingly, in the FIGURE, the GPRS network 5 comprises one serving GPRS support node SGSN. On the network side, the SGSN controls certain functions of the packet radio service. These functions include logging on and off the system by subscribers 1, subscribers' 1 routing area updates, and routing data packets to the right destinations. A GPRS network typically also comprises at least one GPRS gateway support node GGSN, via which the different sub-networks of the GPRS network are connected to an external data network, such as the Internet. An intra-operator backbone network, in turn, interconnects the different support nodes SGSN and GGSN. It is to be understood that the GPRS network 5 may comprise an arbitrary number of support nodes and gateway support nodes. In a cellular packet radio network, each support node SGSN manages the packet data service in the area of one or more cells. For this purpose, each support node SGSN is connected to a certain local part of, for example, the GSM system (the FIGURE does not show the connection). The connection is typically to a mobile switching centre MSC, but in certain situations it may be advantageous to make the connection directly to a base station system BSS, i.e. to a base station controller BSC or to some base station BTS. In a cell, the subscriber 1 communicates over the radio interface with the base station BTS and, further, through the mobile network, with the support node SGSN to whose service area the cell belongs. In principle, the mobile network between the support node SGSN and the subscriber 1 only transmits packets between the two. Consequently, the mobile network may offer either a circuit-switched connection or packet-switched data packet transmission between the subscriber 1 and the serving support node SGSN. However, it should be noted that the mobile network only offers a physical connection between the subscriber 1 and the support node SGSN, and its detailed operation and structure are not relevant to the invention.

The circuit-switched network 6 shown in the FIGURE is for example a state-of-the-art GSM network, whose structure is obvious to a person skilled in the art. The networks 5 and 6 of the mobile system 3 typically comprise common physical network elements, as was described above for the GPRS network. However, logically the networks 5 and 6 can be dealt with separately. For the sake of clarity, the FIGURE shows the connection between the subscriber 1 and the support node SGSN in a simplified manner, and does not show the network elements between them. The connection between the subscriber 1 and the mobile switching centre MSC is shown in the same way.

Typically, mobile systems comprise at least one home location register (HLR) or a corresponding network element and several visitor location registers (VLR, not shown in the FIGURE). In its database 7 (DB), the home location register HLR typically stores static subscriber data on all subscribers registered in said network, such as data on different services the subscriber is entitled to use, and subscriber location data at the accuracy of at least a visitor location register. Also the subscribers' roaming right data is stored to the database 7 of the HLR. The network elements via which the subscriber 1 sets up a connection to the alien mobile system 3 can communicate with the home location register HLR located in the subscriber's home system. The FIGURE shows a simplified structure in which the subscriber sets up a connection to the mobile switching centre MSC of the circuit-switched network 6 and/or to the support node SGSN of the packet-switched network 5, from which the FIGURE shows a direct connection to the home location register HLR. In practice, other network elements may be located between said network elements, depending on the structure of the network. However, the operation of these network elements is not relevant to the present invention, and is therefore not described in greater detail. A data transmission connection between a home location register HLR and a mobile switching centre MSC or a support node SGSN can be implemented for example by the MAP protocol (Mobile Application Part).

As the subscriber 1 moves to the area of an alien mobile system 3 (i.e. other than the subscriber's 1 home mobile system 2), for example when the mobile station is switched on or when it moves from a base station in the area of the subscriber's 1 home mobile system 2 to a base station in the area of said alien mobile system 3, either with no call connection between the subscriber's 1 mobile station and the base station, or during handover, the alien mobile system 3 checks from the home location register HLR located in the subscriber's home system 2 if the subscriber is entitled to roam said system. If the subscriber's 1 mobile station supports both circuit-switched (e.g. GSM) and packet-switched (e.g. GPRS) functions, it attempts to attach (Attach Request) to both the GSM network 6 and the GPRS network 5. As regards the GSM network, the attach request is relayed to the mobile switching centre MSC, which checks from the home location register HLR in the subscriber's 1 home system 2 if the subscriber's 1 roaming is allowed. Similarly, as regards the GPRS network, the attach request is relayed to the serving GPRS support node SGSN, which also checks from the home location register HLR in the subscriber's home system if the subscriber's roaming is allowed. In response to a check request (Update Location) received from the support node SGSN or the mobile switching centre MSC, the home location register HLR checks from its database 7 the subscriber's 1 rights to roam the alien mobile system 3. In accordance with the invention, when making the check, the home location register HLR also detects the type of network the request is received from. This may be implemented by the database 7 of the home location register HLR comprising a common parameter file for its subscribers' 1 roaming rights in different types of networks 5 and 6, whereby the home location register HLR checks the subscriber's 1 roaming rights from the parameter file in the mobile system 3, taking into account only the data concerning the type of network from which the inquiry is received. An alternative is for the database 7 of the home location register HLR to comprise separate parameter files for the subscribers' 1 roaming rights in different types of networks 5 and 6, whereby the home location register HLR checks the subscriber's 1 roaming rights in the mobile system 3 from the parameter file for that type of network from which the inquiry is received. The use of a common parameter file is advantageous if the different networks 5 and 6 have common roaming parameters. As regards the basic idea of the invention, the precise format of the parameter file is not relevant. On the basis of the check, the home location register HLR either allows or denies the subscriber's 1 roaming the network 5 or 6 and notifies said network thereof, in which case, if roaming is allowed, the attach procedure continues as is usual for that particular network, and, if roaming is denied, the attach procedure is interrupted for that particular network.

In accordance with a preferred embodiment of the invention, different subscription types possibly defined for the subscriber 1 are taken into account when the subscriber's 1 roaming rights are checked. Different subscription types can include for example different charging methods. In addition to normal charging, the GPRS (or GSM for instance) network may support for example the following subscription types associated with charging: a prepaid subscription, which means that services used are paid in advance, a flat rate subscription, which means that a fixed tariff is charged for a service for a certain time regardless of the actual use of the service during that time, and a hot billing subscription, which means that a subscriber's billing data is updated with the minimum delay thus enabling almost real-time billing or producing an estimate of the bill at any given time, for example. Subscription types are preferably service type specific i.e. defined separately for each service type (such as GSM or GPRS), an example being a GPRS prepaid subscription. Different subscription types defined for the subscribers 1 are preferably stored in the database 7 of the HLR (or to a similar network element). For each subscriber 1, the subscriber data in the home location register HLR may include for example different parameters indicating the subscription types defined for the subscriber 1. The subscription types defined for the subscriber 1 at any given time may vary: for example the subscriber's 1 prepaid subscription is annulled when the prepaid deposit has been used up and, on the other hand, redefined when the subscriber 1 makes a new deposit. Furthermore, the home location register HLR comprises, for example in the aforementioned parameter file containing roaming rights, parameters indicating the subscription types to which roaming the alien mobile system 3 is allowed. The home location register HLR checks these parameters and the subscription types defined for the subscriber and, on the basis of the check, the home location register HLR either allows or denies the subscriber's 1 roaming the network 5 or 6 of the alien mobile system 3. In accordance with a preferred embodiment of the invention, the subscriber 1 is not allowed to roam a network 5 or 6 if even one of the subscription types defined for the subscriber 1 and related to the service type provided by the network 5 or 6 in question is such that roaming is not allowed for said subscription type in the mobile system 3 to which the network 5 or 6 belongs. For example, if subscription types GPRS prepaid and GPRS hot billing are defined to a subscriber 1 trying to roam a GPRS network 5 of a mobile system 3 and only GPRS prepaid is an allowed subscription type for said subscriber 1 in said mobile system 3 and subscription type GPRS hot billing is not, the subscriber 1 is preferably not allowed to roam the GPRS network 5 of the mobile system 3 at all because of the one not allowed subscription type defined for the subscriber 1. This way roaming of the subscriber 1 can be controlled service type specifically based on service type specific subscription types defined for the subscriber 1.

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A method of controlling roaming in a mobile system comprising at least two networks, which can offer a roaming subscriber attached to the system a circuit-switched and/or a packet-switched connection; the method comprising:
    allowing or denying a subscriber's roaming in the mobile system, when the subscriber attempts to attach to the mobile system, on the basis of the subscriber's roaming right data, which data indicates if the subscriber is entitled to roam that particular mobile system, wherein
    at least two subscription type are definable for the subscriber, and the subscriber's roaming in each network of the mobile system that the subscriber attempts to attach to is allowed or denied separately on the basis of the subscriber's roaming right data, which data indicates if the subscriber is entitled to roam a particular type of network in that particular mobile system, and on the basis of data on the subscription types defined for the subscriber and on subscription types for which roaming is allowed in said mobile system, wherein
    when the subscriber attempts to attach to a network of the mobile system, the method comprises:
    checking from a network element comprising the subscriber's roaming right data if the subscriber is entitled to roam that particular type of network in that particular mobile system,
    performing a check from a network element comprising data on the subscription type defined for the subscriber and on subscription types for which roaming is allowed in said mobile system regarding said subscriber types to find out if roaming in said mobile system is allowed, and,
    on the basis of said checks, allowing or denying the subscriber's roaming in said network of the mobile system.

2. The method of claim 1, wherein said network element is the subscriber's home location register in the subscriber's home system.

3. The method of claim 1, wherein the subscription types include at least one of the following: a normal subscription, a prepaid subscription, a flat rate subscription and a hot billing subscription.

4. The method of claim 1, wherein the subscription types are service type specific.

5. The method of claim 4, wherein the method comprises denying the subscriber's roaming in the network of the mobile system if at least one of the subscription types defined for the subscriber and related to the service type provided by the network in question is such for which roaming in said mobile system is not allowed.

6. The method of claim 1, wherein the mobile system comprises a circuit-switched network, such as a GSM network, and a packet-switched network, such as a GPRS network.

7. A network element in a mobile system, comprising:
    a database comprising roaming right data on subscribers of the mobile system, the network element being adapted:
    in response to an inquiry from an alien mobile system, to check its database and to indicate the right of a subscriber of the mobile system to roam the alien mobile system when the subscriber of the mobile system attempts to attach to the alien mobile system, and
    in response to an inquiry from a certain type of network in the alien mobile system, to check its database and to indicate the right of the subscriber of the mobile system to roam that particular type of network in the alien mobile system when the subscriber of the mobile system attempts to attach to said network in the alien mobile system, and to check its database comprising data on subscription types defined for the subscriber and on subscription types for which roaming is allowed in an alien mobile system and to indicate, based on said check, the right of the subscriber of the mobile system to roam the alien mobile system when at least two subscription types are definable for a subscriber of the mobile system, in response to an inquiry from the network of the alien mobile system when the subscriber of the mobile system attempts to attach to said network in the alien mobile system.

8. The network element in a mobile system of claim 7, wherein said subscription types comprise at least one of the following: a normal subscription, a prepaid subscription, a flat rate subscription and a hot billing subscription.

9. The network element in a mobile system of claim 7, wherein the subscription types are service type specific.

10. The network element in a mobile system of claim 9, wherein the subscriber is allowed to roam the network of the alien mobile system only if roaming in said alien mobile system is allowed for all subscription types defined for the subscriber and related to the service type provided by the network in question.

11. The network element in a mobile system of claim 7, wherein the database of the network element comprises a common parameter file for the roaming rights of the subscribers of the mobile system in different types of networks of alien mobile systems, whereby the network element is adapted to check the subscriber's roaming rights from the parameter file only for that type of network from which the inquiry is received.

12. The network element in a mobile system of claim 7, wherein the database of the network element comprises separate parameter files for the roaming rights of the subscribers of the mobile system in different types of networks of alien mobile networks, whereby the network element is adapted to check the subscriber's roaming rights from the parameter file for that type of network from which the inquiry is received.

13. The network element in a mobile system of claim 7, wherein the network element belongs to a mobile system comprising a circuit-switched GSM network and a packet-switched GPRS network.

14. The network element in a mobile system of claim 7, wherein said network element is a home location register.

\* \* \* \* \*